(12) United States Patent
Lee et al.

(10) Patent No.: US 11,300,271 B2
(45) Date of Patent: Apr. 12, 2022

(54) LIGHT SOURCE MODULE AND LIGHT GUIDE PLATE

(71) Applicant: CHAMP VISION DISPLAY INC., Miaoli County (TW)

(72) Inventors: Hsin-Hung Lee, Hsin-Chu (TW); Chin-Ku Liu, Hsin-Chu (TW); Chung-Hao Wu, Hsin-Chu (TW); Kun-Hsien Lee, Hsin-Chu (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 17/016,395

(22) Filed: Sep. 10, 2020

(65) Prior Publication Data

US 2021/0080078 A1    Mar. 18, 2021

(30) Foreign Application Priority Data

Sep. 12, 2019    (CN) .......................... 201921516282.5

(51) Int. Cl.
*F21V 7/09*    (2006.01)
*F21V 7/05*    (2006.01)
*F21V 7/00*    (2006.01)

(52) U.S. Cl.
CPC .............. *F21V 7/05* (2013.01); *F21V 7/0008* (2013.01); *F21V 7/0033* (2013.01); *F21V 2200/20* (2015.01)

(58) Field of Classification Search
CPC ......... F21V 7/05; F21V 7/0008; F21V 7/0033
USPC ..................................................... 362/296.01
See application file for complete search history.

(56) References Cited

U.S. PATENT DOCUMENTS

| 10,883,670 | B1* | 1/2021 | Liu | ........................... F21K 9/68 |
| 2010/0039832 | A1* | 2/2010 | Ahlgren | ............... G02B 6/0013 |
| | | | | 362/613 |
| 2017/0146721 | A1* | 5/2017 | Fukui | ................... G02B 6/0031 |
| 2017/0192244 | A1* | 7/2017 | Shinohara | .............. G02B 6/003 |
| 2019/0383985 | A1* | 12/2019 | Saeki | ................... G02B 6/0043 |
| 2020/0029407 | A1* | 1/2020 | Takagi | ...................... A63F 5/04 |

FOREIGN PATENT DOCUMENTS

| JP | 2006075362 | 3/2006 |
| JP | 2018152286 | 9/2018 |
| TW | 201636536 | 10/2016 |

* cited by examiner

*Primary Examiner* — Christopher M Raabe
(74) *Attorney, Agent, or Firm* — JCIPRNET

(57) ABSTRACT

The invention provides a light source module including a light guide plate and light emitting elements. The light guide plate includes a main plate body and a plurality of optical microstructures. The main plate body has a light emitting surface and a back surface opposite to each other, and a light incident surface connected therebetween. The optical microstructures are formed on the back surface. Each optical microstructure includes at least two sections connected to each other, each section having a reflective surface. The light emitting elements are disposed on the light incident surface, and light emitted by each of the light emitting elements is reflected by at least some of the reflective surfaces and transmitted to the light emitting surface. In any optical microstructure, the reflective surfaces are not parallel to each other.

16 Claims, 4 Drawing Sheets

LIGHT SOURCE MODULE AND LIGHT GUIDE PLATE

CROSS-REFERENCE TO RELATED APPLICATION

This application claims the priority benefit of China application serial no. 201921516282.5, filed on Sep. 12, 2019. The entirety of the above-mentioned patent application is hereby incorporated by reference herein and made a part of this specification.

BACKGROUND OF THE INVENTION

Field of the Invention

The invention relates to a light source module and a light guide plate, and more particularly, to a light source module and a light guide plate having a plurality of optical microstructures.

Description of Related Art

With the advancement of lighting technology, besides lamps generally for providing a lighting function, decorative lighting panels for providing a decorative effect have been developed. In such a decorative lighting panel, optical microstructures are formed on a back surface of a light guide plate, and a position of each optical microstructure and an angle of a reflective surface are configured according to an effect needing to be presented by the decorative lighting panel. After being incident from a side surface (light incident surface) of the light guide plate, light emitted by a light source may be reflected via the optical microstructures, transmitted to a front surface (light emitting surface) of the light guide plate and emitted therefrom, so that a user may view static or dynamic patterns and texts composed of light from the front surface of the light guide plate. However, after the light emitted by the light source is reflected in the light guide plate, only a small part of the light passes through the light emitting surface and is projected straight ahead of the light guide plate, that is, light utilization efficiency is not good. In addition, as the effect to be presented by the decorative lighting panel is more complex, more optical microstructures need to be disposed, which increases the difficulty and cost of a manufacturing process for the light guide plate.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a light source module and a light guide plate, which improve light utilization efficiency and reduce the difficulty and cost of a manufacturing process.

Other objectives and advantages of the invention may be further understood from the technical features disclosed in the invention.

In order to achieve one or a part or all of the above objectives or other objectives, the embodiments of the invention provide a light source module including a light guide plate and a plurality of light emitting elements. The light guide plate includes a main plate body and a plurality of optical microstructures. The main plate body has a light emitting surface and a back surface opposite to each other, and has a light incident surface connected between the light emitting surface and the back surface. The optical microstructures are formed on the back surface. Each of the optical microstructures includes at least two sections connected to each other, each section having a reflective surface. The light emitting elements are disposed on the light incident surface, and light emitted by each of the light emitting elements is reflected by at least some of the reflective surfaces and transmitted to the light emitting surface. In any one of the optical microstructures, the reflective surfaces are not parallel to each other.

In order to achieve one or a part or all of the above objectives or other objectives, the embodiments of the invention provide a light source module including a light guide plate and a plurality of light emitting elements. The light guide plate includes a main plate body and a plurality of optical microstructures. The main plate body has a light emitting surface and a back surface opposite to each other, and has a light incident surface connected between the light emitting surface and the back surface. The optical microstructures are formed on the back surface. Each of the optical microstructures includes at least two sections connected to each other, each section having a reflective surface. The light emitting elements are disposed on the light incident surface, and light emitted by each of the light emitting elements is reflected by at least some of the reflective surfaces and transmitted to the light emitting surface. In any one of the optical microstructures, the light emitted by at least some of the light emitting elements is reflected by the reflective surfaces respectively and transmitted along a same light emission direction.

In order to achieve one or a part or all of the above objectives or other objectives, the embodiments of the invention provide a light guide plate which is applicable to a light source module including a plurality of light emitting elements. The light guide plate includes a main plate body and a plurality of optical microstructures. The main plate body has a light emitting surface and a back surface opposite to each other, and has a light incident surface connected between the light emitting surface and the back surface. The optical microstructures are formed on the back surface. Each of the optical microstructures includes at least two sections connected to each other, each section having a reflective surface. In any one of the optical microstructures, the reflective surfaces are not parallel to each other, and are configured to reflect light emitted by at least some of the light emitting elements respectively to transmit the light to the light emitting surface.

In order to achieve one or a part or all of the above objectives or other objectives, the embodiments of the invention provide a light guide plate which is applicable to a light source module including a plurality of light emitting elements. The light guide plate includes a main plate body and a plurality of optical microstructures. The main plate body has a light emitting surface and a back surface opposite to each other, and has a light incident surface connected between the light emitting surface and the back surface. The optical microstructures are formed on the back surface. Each of the optical microstructures includes at least two sections connected to each other. Each of the sections includes a reflective surface. The light emitting elements are disposed on the light incident surface. Light emitted by each of the light emitting elements is reflected by at least some of the reflective surfaces and transmitted to the light emitting surface. In any one of the optical microstructures, the reflective surfaces are configured to reflect the light emitted by at least some of the light emitting elements respectively to transmit the light along a same light emission direction.

Based on the above, the embodiments of the invention have at least one of the following advantages or effects. In the light guide plate of the invention, each optical microstructure has at least two reflective surfaces not parallel to each other, so that the at least two reflective surfaces may be used to respectively reflect a plurality of light rays from different light emitting elements, which may be effectively emitted after being reflected by a single optical microstructure, thereby improving the light utilization efficiency. In addition, if at least two different reflective surfaces are disposed on a single optical microstructure as described above, a sufficient number of reflective surfaces may be provided by a small number of optical microstructures, thereby simplifying a manufacturing process.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
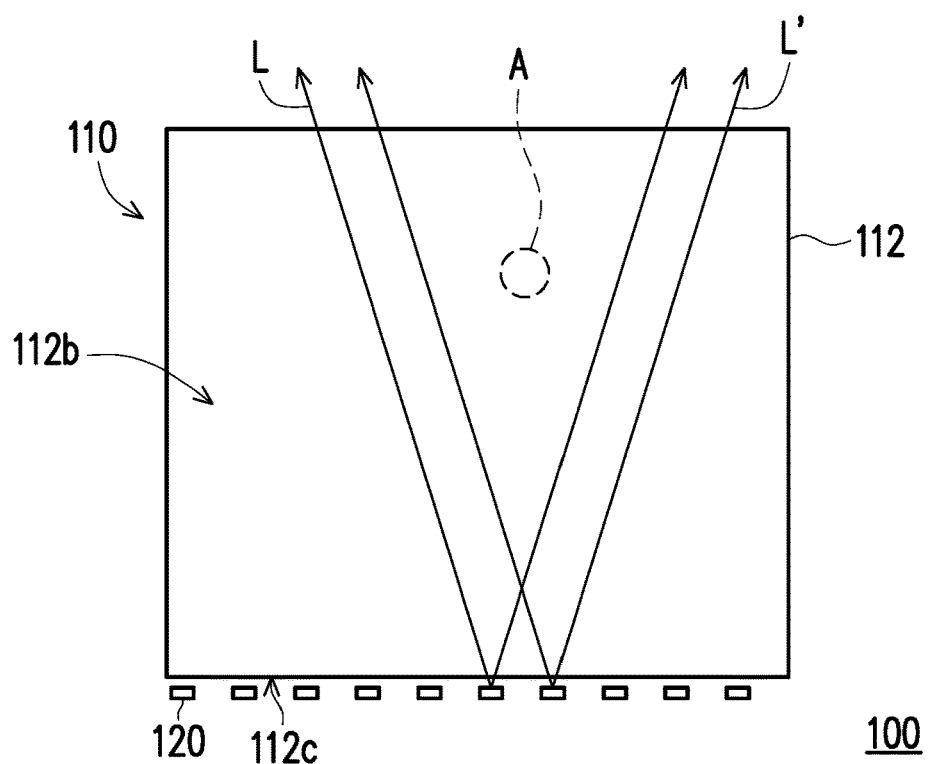
FIG. 1 is a schematic rear view of a light source module according to an embodiment of the invention.
Figure 2:
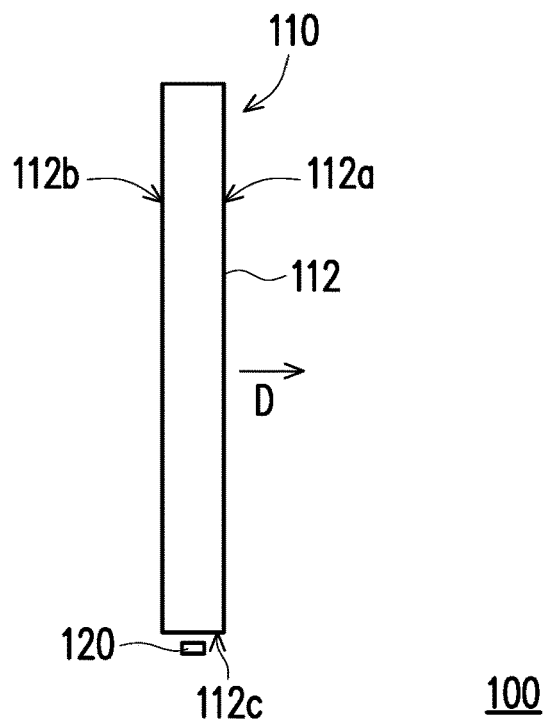
FIG. 2 is a schematic side view of the light source module of FIG. 1.

FIG. 1 is a schematic rear view of a light source module according to an embodiment of the invention. FIG. 2 is a schematic side view of the light source module of FIG. 1. Referring to FIG. 1 and FIG. 2, a light source module 100 of the present embodiment is, for example, a decorative lighting panel and includes a light guide plate 110 and a plurality of light emitting elements 120. A main plate body 112 of the light guide plate 110 has a light emitting surface 112a and a back surface 112b opposite to each other, and has a light incident surface 112c connected between the light emitting surface 112a and the back surface 112b. The light emitting elements 120 are, for example, light emitting diode elements, and are disposed on the light incident surface 112c of the main plate body 112. Light emitted by each of the light emitting elements 120 enters the main plate body 112 from the light incident surface 112c and is reflected in the main plate body 112 and projected from the light emitting surface 112a, so that a user may view a static or dynamic pattern and text composed of light from the light emitting surface 112a.

Figure 3:
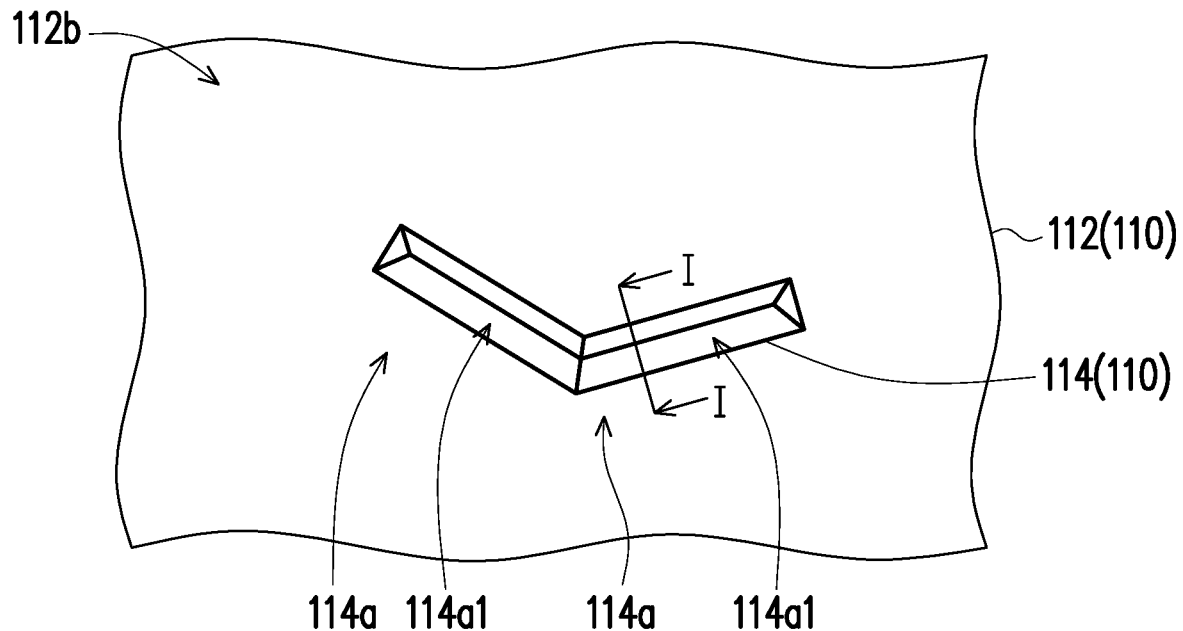
FIG. 3 illustrates a single optical microstructure of a light guide plate of FIG. 1 in a region A.
Figure 4:
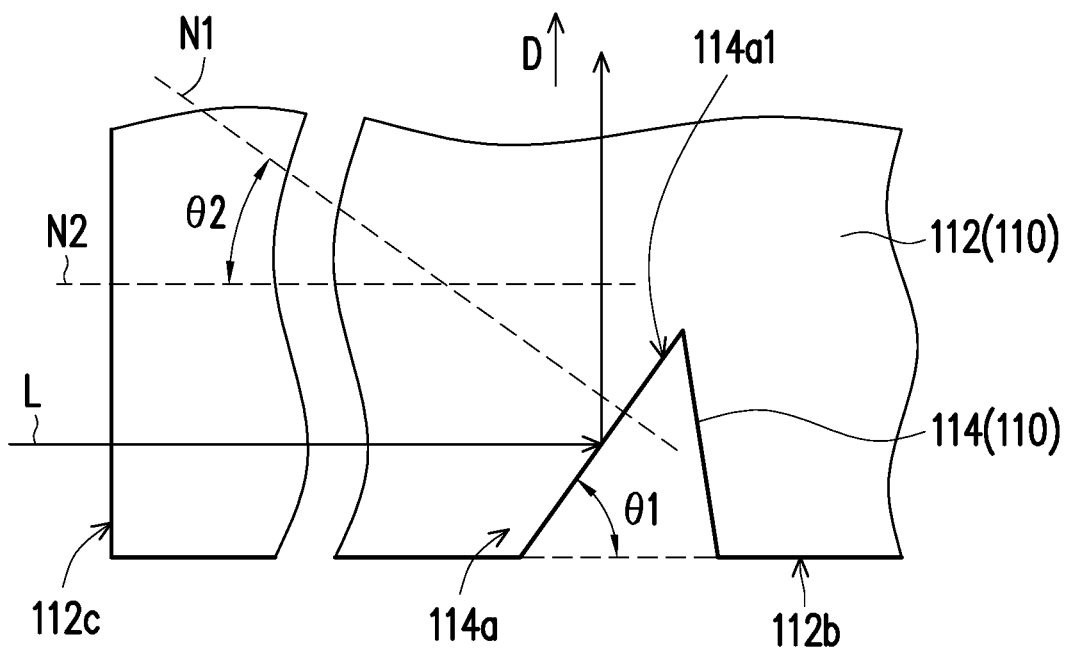
FIG. 4 is a cross-sectional view of the optical microstructure of FIG. 3 along a line I-I.

FIG. 3 illustrates a single optical microstructure of the light guide plate of FIG. 1 in a region A. FIG. 4 is a cross-sectional view of the optical microstructure of FIG. 3 along a line I-I. Referring to FIG. 3 and FIG. 4, in detail, the light guide plate 110 includes a plurality of optical microstructures 114 (FIG. 3 and FIG. 4 illustrate one optical microstructure 114). The optical microstructures 114 are formed on the back surface 112b of the main plate body 112. Each of the optical microstructures 114 includes, as shown in FIG. 3, at least two sections 114a connected to each other, each section 114a having a reflective surface 114a1. Light emitted by each of the light emitting elements 120 (two light rays L and L' emitted by two light emitting elements 120, illustrated in FIG. 1) is reflected by at least some of the reflective surfaces 114a1 and transmitted to the light emitting surface 112a.

In any one of the optical microstructures 114, two adjacent sections 114a are relatively bent such that the reflective surfaces 114a1 are not parallel to each other, as shown in FIG. 3. Thus, the at least two reflective surfaces 114a1 may be used to respectively reflect a plurality of light rays (light rays L and L' as shown in FIG. 1) from different light emitting elements 120, which may be effectively emitted after being reflected by the plurality of reflective surfaces 114a1 of a single optical microstructure 114 and transmitted along a same light emission direction D, thereby improving light utilization efficiency. By forming each of the reflective surfaces 114a1 to have an appropriate tilt angle, the light emission direction D may be controlled to, for example, be perpendicular to the light emitting surface 112a of the light guide plate 110, so that the user located straight ahead of the light emitting surface 112a may clearly view a static or dynamic pattern and text composed of the light rays. In addition, if at least two different reflective surfaces 114a1 are disposed on the single optical microstructure 114 as described above, a sufficient number of reflective surfaces 114a1 may be provided by a small number of optical microstructures 114, thereby simplifying a manufacturing process and increasing transparency of the light guide plate 110.

Referring to FIG. 4, in the present embodiment, an angle θ1 between each of the reflective surfaces 114a1 and the back surface 112b is, for example, between 25 degrees and 65 degrees. In addition, an angle θ2 between a normal N1 of each of the reflective surfaces 114a1 and a normal N2 of the light incident surface 112c is, for example, less than 90 degrees. In other embodiments, the angle θ1 and the angle θ2 may be of other suitable sizes than those illustrated in FIG. 4, and are not limited by the invention.

The invention does not limit the number of sections of each optical microstructure and a connection manner therebetween, which will be exemplified below with reference to the drawings.

Figure 5:
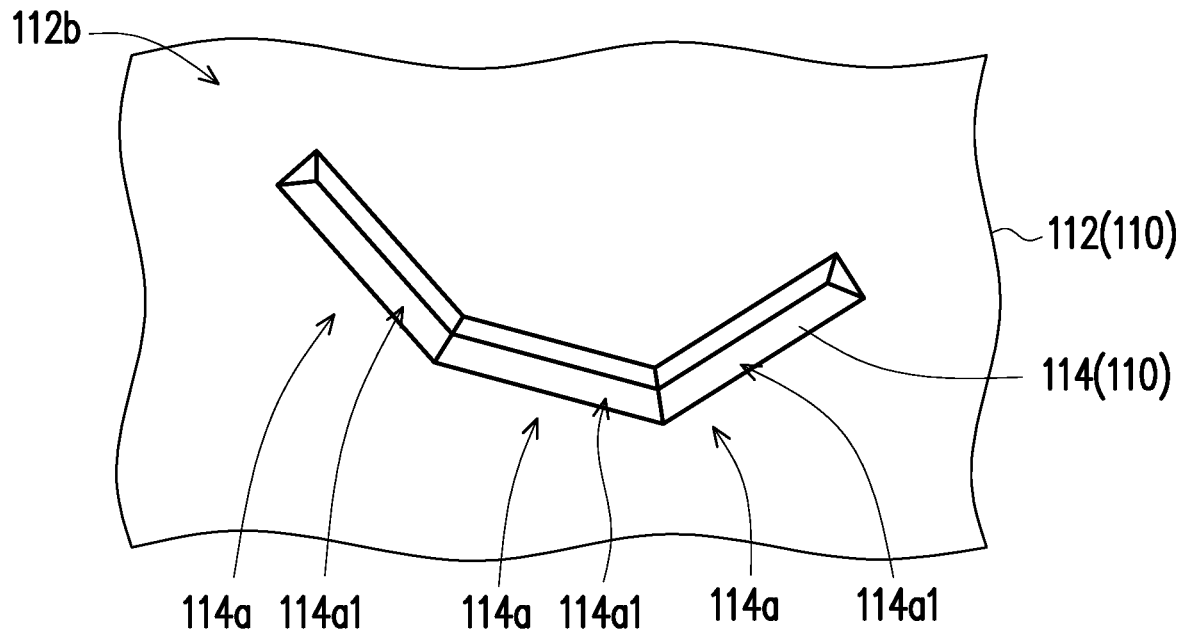
FIG. 5 illustrates a single optical microstructure of a light guide plate according to another embodiment of the invention.

FIG. 5 illustrates a single optical microstructure of a light guide plate according to another embodiment of the invention. The embodiment of FIG. 5 differs from the embodiment of FIG. 3 in that the optical microstructure 114 of FIG. 5 includes three sections 114a connected sequentially. In other embodiments, the optical microstructures 114 may include a greater number of sections 114a according to design needs.

Figure 6:
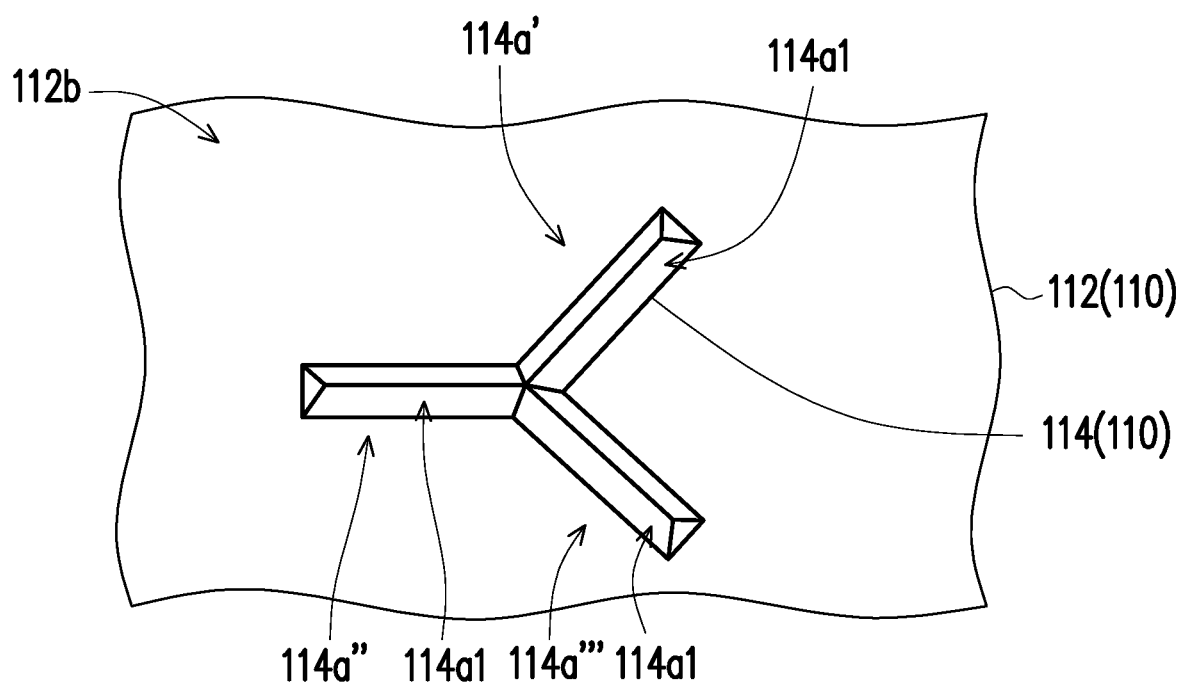
FIG. 6 illustrates a single optical microstructure of a light guide plate according to another embodiment of the invention.

FIG. 6 illustrates a single optical microstructure of a light guide plate according to another embodiment of the invention. The embodiment of FIG. 6 differs from the embodiment of FIG. 5 in that the optical microstructure 114 includes a first section 114a', a second section 114a" and a third section 114a'", wherein the first section 114a' and the second section 114a" are connected to a same end of the third section 114a'" to constitute a Y-shaped structure. In other embodiments, the optical microstructure may include a greater number of sections to constitute a structure of, for example, an asterisk (*) shape or other shapes.

Figure 7:
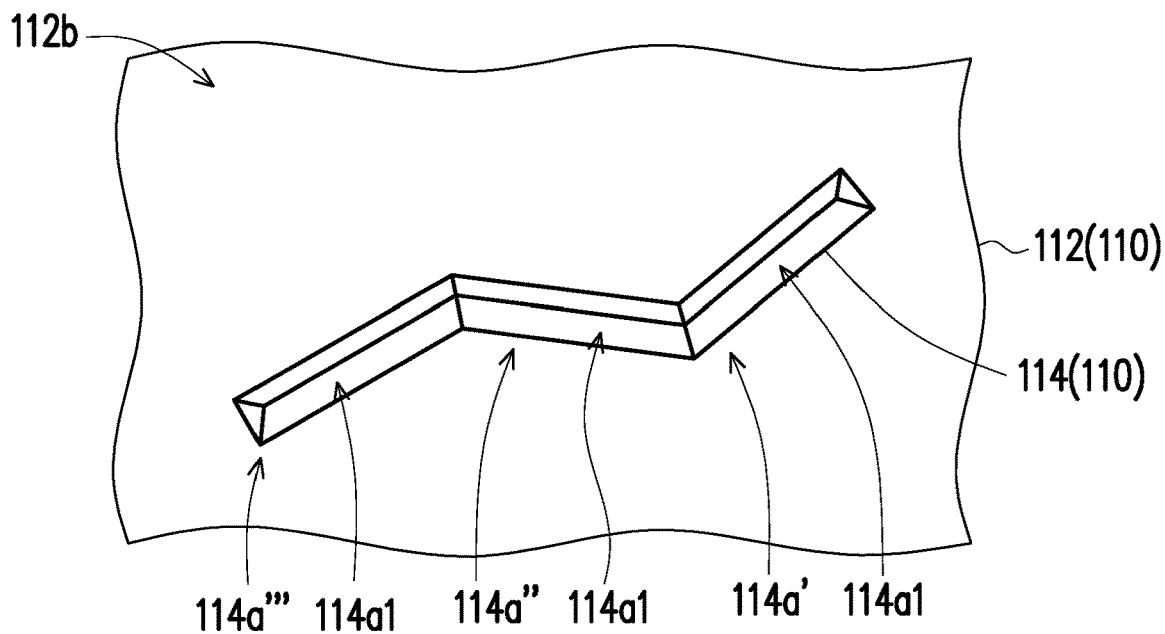
FIG. 7 illustrates a single optical microstructure of a light guide plate according to another embodiment of the invention.

FIG. 7 illustrates a single optical microstructure of a light guide plate according to another embodiment of the invention. The embodiment of FIG. 7 differs from the embodiment of FIG. 5 in that the optical microstructure 114 includes a first section 114a', a second section 114a" and a third section 114a'", where a relative bending direction of the first section 114a' and the second section 114a" is opposite to a relative bending direction of the second section 114a" and the third section 114a'" to constitute a zigzag structure.

Figure 8:
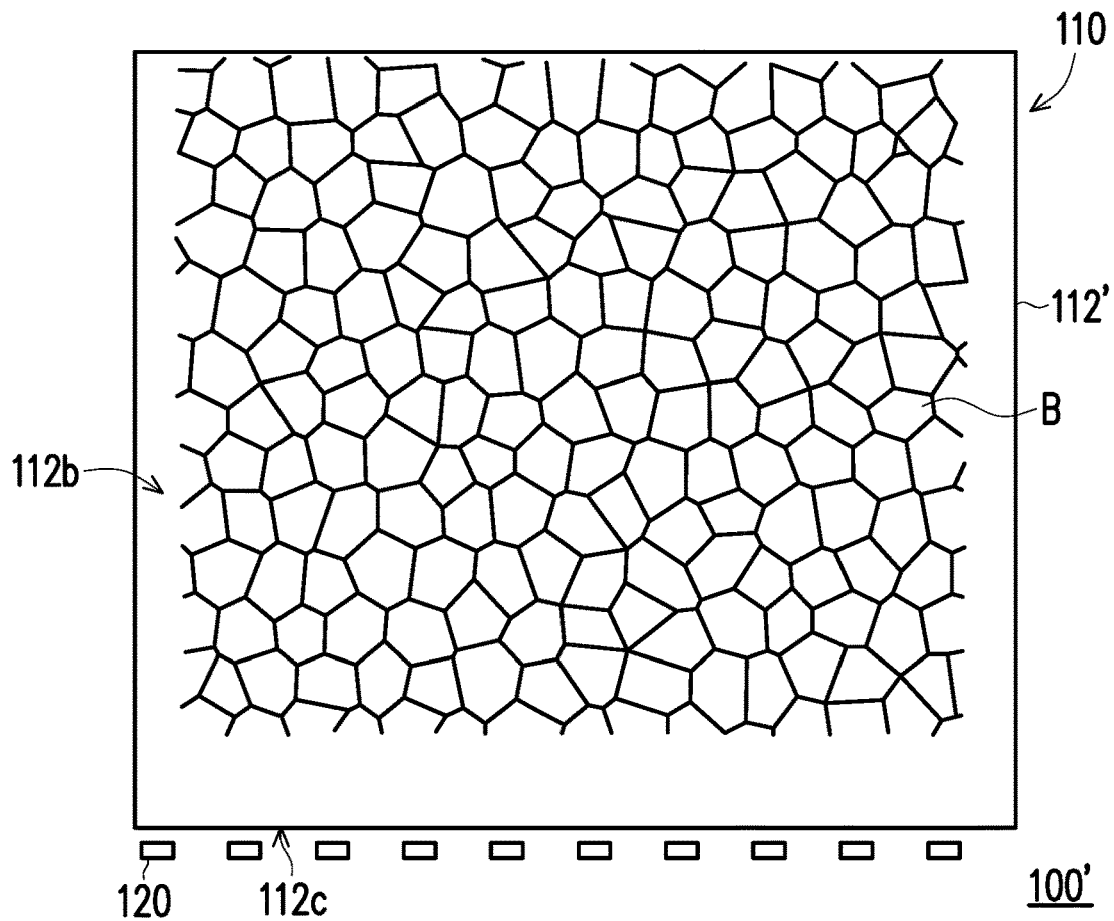
FIG. 8 is a schematic rear view of a light source module according to another embodiment of the invention.

The above optical microstructures 114 may be configured to generate a mosaic effect in addition to reflecting light from the light emitting elements 120 to generate a corresponding pattern or text, which will be described below with reference to the drawings. FIG. 8 is a schematic rear view of a light source module according to another embodiment of the invention. A light source module 100' shown in FIG. 8 differs from the light source module 100 shown in FIG. 1 in that a light incident surface 112b of a main plate body 112' of the light guide plate 110 of FIG. 8 is divided into a plurality of blocks B, the orientation of a reflective surface of an optical microstructure in each block B is different from the orientation of a reflective surface of an optical microstructure in another block B adjacent thereto, and a mosaic visual effect may be generated by controlling a light emitting sequence of each light emitting element 120 or by different view angles of a user.

Based on the foregoing, the embodiments of the invention have at least one of the following advantages or effects. In the light guide plate of the invention, each optical microstructure has at least two reflective surfaces not parallel to each other, so that the at least two reflective surfaces may be used to respectively reflect a plurality of light rays from different light emitting elements, which may be effectively emitted after being reflected by a single optical microstructure, thereby improving the light utilization efficiency. In addition, if at least two different reflective surfaces are disposed on the single optical microstructure as described above, a sufficient number of reflective surfaces may be provided by a small number of optical microstructures, thereby achieving simplifying a manufacturing process and increasing the transparency of the light guide plate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising a light guide plate and a plurality of light emitting elements, wherein
the light guide plate comprises a main plate body and a plurality of optical microstructures, wherein
the main plate body comprises a light emitting surface and a back surface opposite to each other, and comprises a light incident surface connected between the light emitting surface and the back surface; and
the plurality of optical microstructures are formed on the back surface, each of the plurality of optical microstructures comprising at least two sections connected to each other, and each of the at least two sections comprising a reflective surface; and
the plurality of light emitting elements are disposed on the light incident surface, light emitted by each of the plurality of light emitting elements being reflected by at least some of the reflective surfaces and transmitted to the light emitting surface,
wherein in any one of the plurality of optical microstructures, the reflective surfaces are not parallel to each other,
wherein at least two sections of the plurality of optical microstructures comprise a first section, a second section and a third section, the first section and the third section are connected to opposite ends of the second section respectively, and a relative bending direction of the first section and the second section being same to or opposite to a relative bending direction of the second section and the third section.

2. The light source module according to claim 1, wherein at least two sections of each of the plurality of optical microstructures are bent relatively.

3. The light source module according to claim 1, wherein an angle between the reflective surface and the back surface is between 25 degrees and 65 degrees.

4. The light source module according to claim 1, wherein an angle between a normal of the reflective surface and a normal of the light incident surface is less than 90 degrees.

5. A light source module, comprising a light guide plate and a plurality of light emitting elements, wherein
the light guide plate comprises a main plate body and a plurality of optical microstructures, wherein
the main plate body comprises a light emitting surface and a back surface opposite to each other, and comprises a light incident surface connected between the light emitting surface and the back surface; and
the plurality of optical microstructures are formed on the back surface, each of the plurality of optical microstructures comprising at least two sections connected to each other, and each of the at least two sections comprising a reflective surface; and
the plurality of light emitting elements are disposed on the light incident surface, light emitted by each of the plurality of light emitting elements being reflected by at least some of the reflective surfaces and transmitted to the light emitting surface,
wherein in any one of the plurality of optical microstructures, light emitted by at least some of the light emitting elements is reflected by the reflective surfaces respectively and transmitted along a same light emission direction,
wherein at least two sections of the plurality of optical microstructures comprise a first section, a second section and a third section, the first section and the third section are connected to opposite ends of the second section respectively, and a relative bending direction of the first section and the second section beingsame to or obbosite to a relative bending direction of the second section and the third section.

6. The light source module according to claim 5, wherein at least two sections of each of the plurality of optical microstructures are bent relatively.

7. The light source module according to claim 5, wherein an angle between the reflective surface and the back surface is between 25 degrees and 65 degrees.

8. The light source module according to claim 5, wherein an angle between a normal of the reflective surface and a normal of the light incident surface is less than 90 degrees.

9. A light guide plate, applicable to a light source module, the light source module comprising a plurality of light emitting elements, and the light guide plate comprising a main plate body and a plurality of optical microstructures, wherein
the main plate body comprises a light emitting surface and a back surface opposite to each other, and comprises a light incident surface connected between the light emitting surface and the back surface; and
the plurality of optical microstructures are formed on the back surface, each of the plurality of optical microstructures comprising at least two sections connected to each other, and each of the at least two sections comprising a reflective surface,
wherein in any one of the plurality of optical microstructures, the reflective surfaces are not parallel to each other, and are configured to reflect light emitted by at least some of the light emitting elements respectively to transmit the light to the light emitting surface,
wherein at least two sections of the plurality of optical microstructures comprise a first section, a second section and a third section, the first section and the third section are connected to opposite ends of the second section respectively, and a relative bending direction of the first section and the second section being same to or opposite to a relative bending direction of the second section and the third section.

10. The light guide plate according to claim 9, wherein at least two sections of each of the plurality of optical microstructures are bent relatively.

11. The light guide plate according to claim 9, wherein an angle between the reflective surface and the back surface is between 25 degrees and 65 degrees.

12. The light guide plate according to claim 9, wherein an angle between a normal of the reflective surface and a normal of the light incident surface is less than 90 degrees.

13. A light guide plate, applicable to a light source module, the light source module comprising a plurality of light emitting elements, and the light guide plate comprising:
a main plate body, comprising a light emitting surface and a back surface opposite to each other, and comprising a light incident surface connected between the light emitting surface and the back surface; and
a plurality of optical microstructures, formed on the back surface, each of the plurality of optical microstructures comprising at least two sections connected to each other, each of the at least two sections comprising a reflective surface, the plurality of light emitting elements being disposed on the light incident surface, and light emitted by each of the plurality of light emitting elements being reflected by at least some of the reflective surfaces and transmitted to the light emitting surface, wherein in any one of the plurality of optical microstructures, the reflective surfaces are configured to reflect light emitted by at least some of the light emitting elements respectively to transmit the light along a same light emission direction, wherein at least two sections of the plurality of optical microstructures comprise a first section, a second section and a third section, the first section and the third section are connected to opposite ends of the second section respectively, and a relative bending direction of the first section and the second section being same to or opposite to a relative bending direction of the second section and the third section.

14. The light guide plate according to claim 13, wherein at least two sections of each of the plurality of optical microstructures are bent relatively.

15. The light guide plate according to claim 13, wherein an angle between the reflective surface and the back surface is between 25 degrees and 65 degrees.

16. The light guide plate according to claim 13, wherein an angle between a normal of the reflective surface and a normal of the light incident surface is less than 90 degrees.

* * * * *